(12) United States Patent
Filsfils et al.

(10) Patent No.: US 11,683,265 B2
(45) Date of Patent: Jun. 20, 2023

(54) MECHANISMS FOR PACKET PATH TRACING AND PER-HOP DELAY MEASUREMENT IN SEGMENT ROUTING WITH MULTIPROTOCOL LABEL SWITCHING (SR-MPLS) NETWORKS

(71) Applicant: Cisco Technology, Inc., San Jose, CA (US)

(72) Inventors: Clarence Filsfils, Brussels (BE); Ahmed Mohamed Ahmed Abdelsalam, L'Aquila (IT); Rakesh Gandhi, Stittsville (CA); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 17/524,553

(22) Filed: Nov. 11, 2021

(65) Prior Publication Data

US 2022/0329518 A1     Oct. 13, 2022

Related U.S. Application Data

(60) Provisional application No. 63/172,389, filed on Apr. 8, 2021.

(51) Int. Cl.
*H04L 45/50* (2022.01)
*H04L 45/00* (2022.01)

(52) U.S. Cl.
CPC ............ *H04L 45/507* (2013.01); *H04L 45/20* (2013.01); *H04L 45/26* (2013.01)

(58) Field of Classification Search
CPC ........ H04L 45/507; H04L 45/20; H04L 45/26
See application file for complete search history.

(56) References Cited

U.S. PATENT DOCUMENTS

2005/0073961 A1     4/2005  Paik et al.
2006/0262735 A1 *  11/2006  Guichard ............... H04L 12/66
                                                                370/254

(Continued)

FOREIGN PATENT DOCUMENTS

KR        20050006442        7/2003
WO    WO-2019239171 A1 * 12/2019 ............. H04L 45/20

OTHER PUBLICATIONS

"In-band Network Telemetry (INT) Dataplane Specification," Feb. 14, 2020, pp. 1-36.

(Continued)

*Primary Examiner* — Michael A Keller
(74) *Attorney, Agent, or Firm* — Polsinelli

(57) ABSTRACT

A network node receives a data packet. In response to receiving the data packet, the network node performs a lookup on a label stack of the data packet to determine a next hop for the data packet. The network node scans the label stack to identify a Structured Entropy Label (SEL). The SEL includes a Path Tracing Indicator (PTI). The network node computes Midpoint Compressed Data (MCD) as a result of the PTI being set to a pre-defined value. The network node records the MCD in a MCD stack of the data packet by shifting the MCD stack and stamping the MCD on top of the MCD stack. The network node transmits the data packet to the next hop with the recorded MCD stack. The network sink node encapsulates the received data packet to generate an encapsulated data packet and transmits the data packet.

20 Claims, 10 Drawing Sheets

(56) References Cited

U.S. PATENT DOCUMENTS

| | | |
|---|---|---|
| 2020/0204469 A1 | 6/2020 | Filsfils et al. |
| 2020/0252316 A1 | 8/2020 | Filsfils et al. |
| 2021/0044520 A1 | 2/2021 | Xu et al. |

OTHER PUBLICATIONS

Basat et al., "PINT: Probalistic In-band Network Telemetry," SIGCOMM '20, Aug. 10-14, 2020, pp. 662-680.

Brockners et al., "Data Fields for In-situ OAM," Mar. 8, 2020, pp. 1-43.

Lapukhov et al., "Data-plan probe for in-band telemetry collection," Jun. 10, 2016, pp. 1-14.

Lapukhov et al., "Move Fast, Unbreak Things! Network debugging at scale," pp. 1-46.

Filsfils et al., "Stateless and Scalable Network Slice Identification for SRv6," Jan. 17, 2020, pp. 1-5.

Brockners et al., "Data Fields for In-situ OAM," Feb. 21, 2021, pp. 1-45.

Gandhi et al., "Segment Routing with MPLS Data Plane Encapsulation for In-situ OAM Data," Aug. 22, 2019, pp. 1-10.

\* cited by examiner

MECHANISMS FOR PACKET PATH TRACING AND PER-HOP DELAY MEASUREMENT IN SEGMENT ROUTING WITH MULTIPROTOCOL LABEL SWITCHING (SR-MPLS) NETWORKS

CROSS-REFERENCE TO RELATED APPLICATIONS

This application claims priority to U.S. Provisional Application No. 63/172,389, filed on Apr. 8, 2021, the content of which is incorporated herein by reference in its entirety.

TECHNICAL FIELD

The present disclosure generally relates to the field of computer networking, particularly with regard to the field of computer networking, particularly with regard to path tracing within a computer network.

BACKGROUND

The ubiquity of Internet-enabled devices has created a significant demand for Internet services and content. As a result, users of these devices have become increasingly reliant on network services and content. Network operators, who may implement more complex and expansive networks in order to satisfy the ever-expanding demand, are often required to provide continued functionality in the event of an issue with one or more devices within the network. However, this can be difficult for various reasons. For example, network operators often have a lack of visibility into the actual path taken by data packets within their networks. This can make operations, such as troubleshooting routing problems and verifying equal-cost multi-path (ECMP) paths, incredibly complex. Further, to improve performance of their networks, it can be desirable for network operators to characterize their networks in terms of delay and load on a per-hop basis.

As a result of these issues, network operators often require solutions that allow them to detect the actual path that a data packet takes between any two nodes within a network. Further, network operators require solutions that allow then to measure the end-to-end delay from ingress to egress within their networks and the per-hop delay at each node on a particular path from ingress to egress. Additionally, for each router along a path, network operators desire a method for detecting the load on the router that forwards the data packet along the path from ingress to egress. These solutions would allow network operators to verify various characteristics of their networks while allowing network operators to identify and trouble any routing problems.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
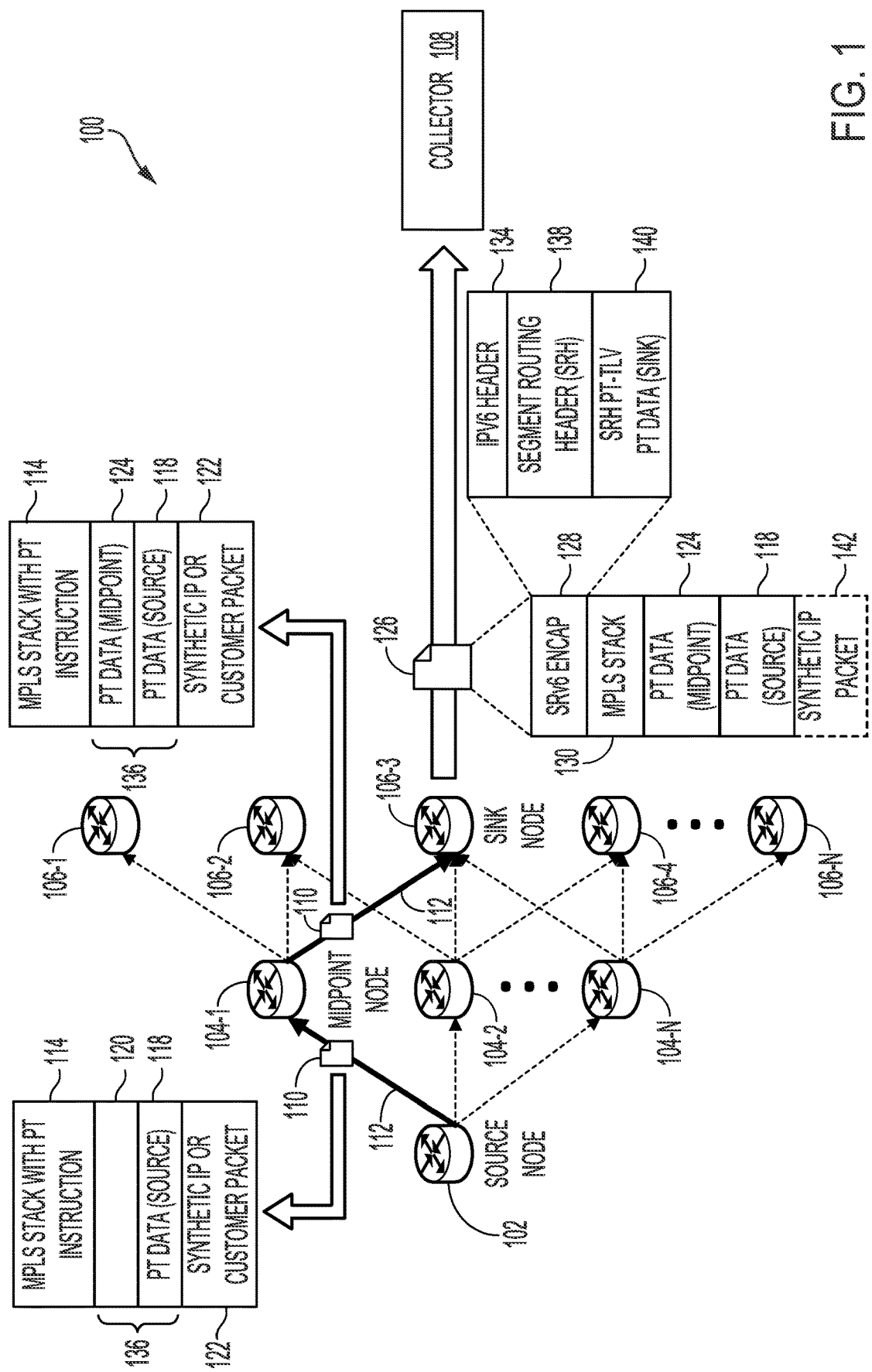
FIG. 1 shows an illustrative example of an environment in which midpoint compressed data (MCD) is added to a data packet by nodes along a network path and encapsulated for processing by a collector in accordance with at least one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for path tracing for multiprotocol label switching (MPLS) and segment routing with MPLS (SR-MPLS) networks.

In an example, a computer-implemented method comprises receiving a data packet. The computer-implemented method further comprises performing a MPLS lookup on a label stack of the data packet to determine a next hop for the data packet. From the data packet, the computer-implemented method further comprises scanning the label stack to identify a label. The label includes a field comprising a path tracing indicator (PTI). The computer-implemented method further comprises computing midpoint compressed data (MCD). The MCD is computed as a result of the PTI in the label stack being set to a pre-defined value. The computer-implemented method further comprises recording the MCD in a MCD stack of the data packet. This MCD is recorded by shifting the MCD stack by a number of bytes equal to a size of the MCD and stamping this MCD on top of the MCD stack in the data packet. The computer-implemented method further comprises transmitting the data packet to the next hop.

In an example, the data packet includes instructions for computing and recording the MCD in the data packet.

In an example, an entropy label control (ELC) field of a structured entropy label (SEL) in the label stack is used to determine a path tracing action for the data packet.

In an example, the label stack of the data packet includes an timestamp, encapsulate, and forward (TEF) label that causes a sink node receiving the data packet to encapsulate the data packet to generate an encapsulated data packet. Further, the TEF label causes the sink node to send the encapsulated data packet to a collector.

In an example, a network programming label (as defined by an operator or reserved by an Internet Engineering Task Force (IETF) standard) is used to determine a path tracing action for the data packet. The network programming label includes one or more fields that are used to determine the path tracing action.

In an example, the PTI is set at a source node to trigger a path tracing action at midpoint nodes.

In an example, the label stack of the data packet further defines a channel type. The channel type indicates a format of a message that follows a generic associated channel (G-ACH) in the label stack. Further, the format is the MCD stack and a source node Type-Length-Value (TLV).

In an example, a system comprises one or more processors and memory including instructions that, as a result of being executed by the one or more processors, cause the system to receive a data packet. The instructions further cause the system to perform a MPLS lookup on a label stack of the data packet to determine a next hop for the data packet. The instructions further cause the system to scan the label stack to identify a label. The label includes a field comprising a PTI. The instructions further cause the system to compute a MCD. The MCD is computed as a result of the PTI in the label stack being set to a pre-defined value. The instructions further cause the system to record the MCD in a MCD stack of the data packet. The MCD is recorded by shifting the MCD stack a number of bytes equal to a size of the MCD and stamping the MCD on top of the MCD stack. The instructions further cause the system to transmit the data packet to the next hop.

In an example, a non-transitory computer-readable storage medium stores thereon executable instructions that, as a result of being executed by one or more processors of a computer system, cause the computer system to receive a data packet. The executable instructions further cause the computer system to perform a MPLS lookup on a label stack of the data packet to determine a next hop for the data packet. The executable instructions further cause the computer system to scan the label stack to identify a label. The label includes a field comprising a PTI. The executable instructions further cause the computer system to compute a MCD. The MCD is computed as a result of the PTI in the label stack being set to a pre-defined value. The executable instructions further cause the computer system to record the MCD in a MCD stack of the data packet. The MCD is recorded by shifting the MCD stack a number of bytes equal to a size of the MCD and stamping the MCD on top of the MCD stack. The executable instructions further cause the computer system to transmit the data packet to the next hop.

DESCRIPTION OF EXAMPLE EMBODIMENTS

Figure 9:
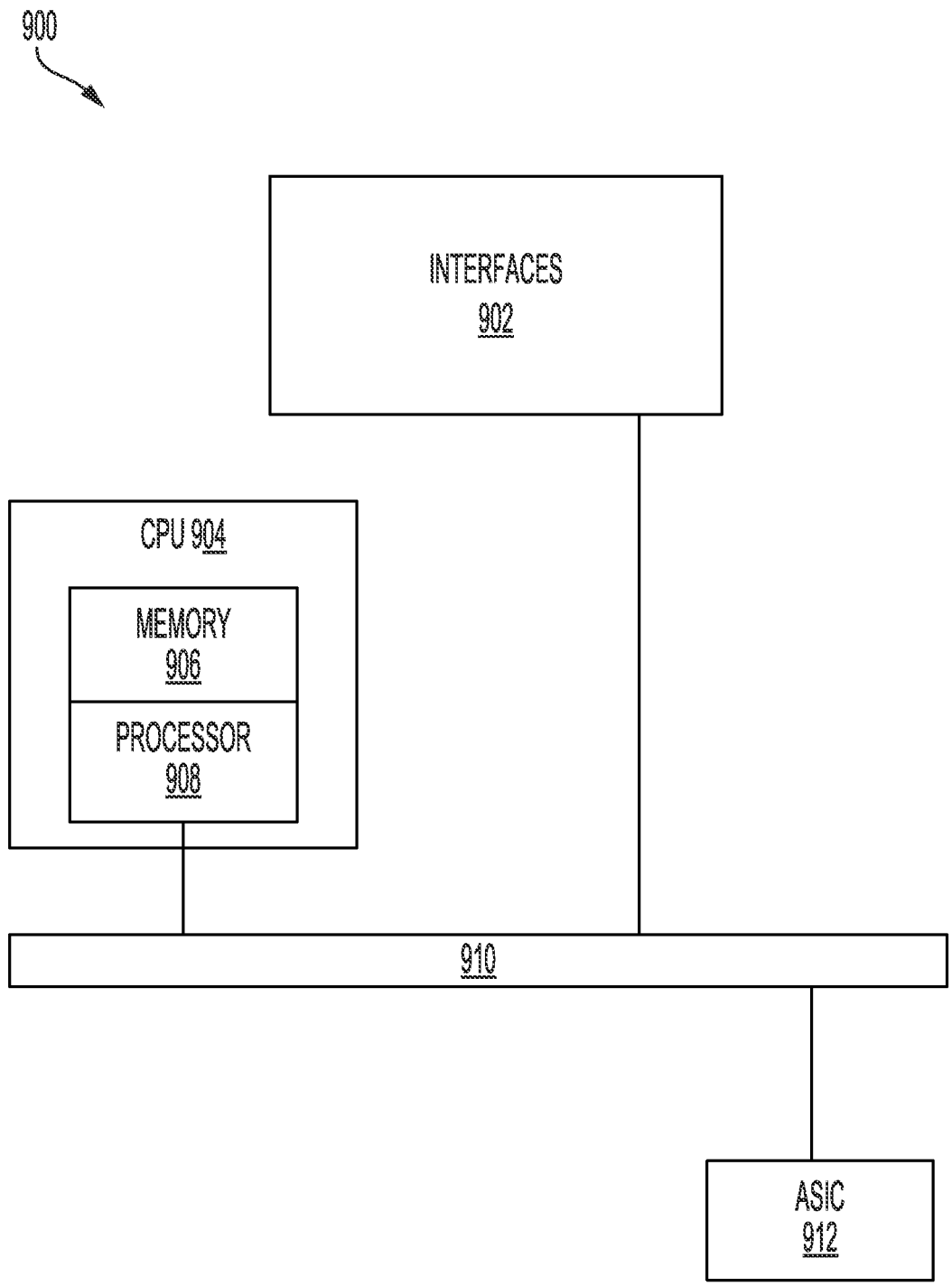
FIG. 9 illustrates an example network device suitable for performing switching, routing, and other networking operations in accordance with some embodiments.
Figure 10:
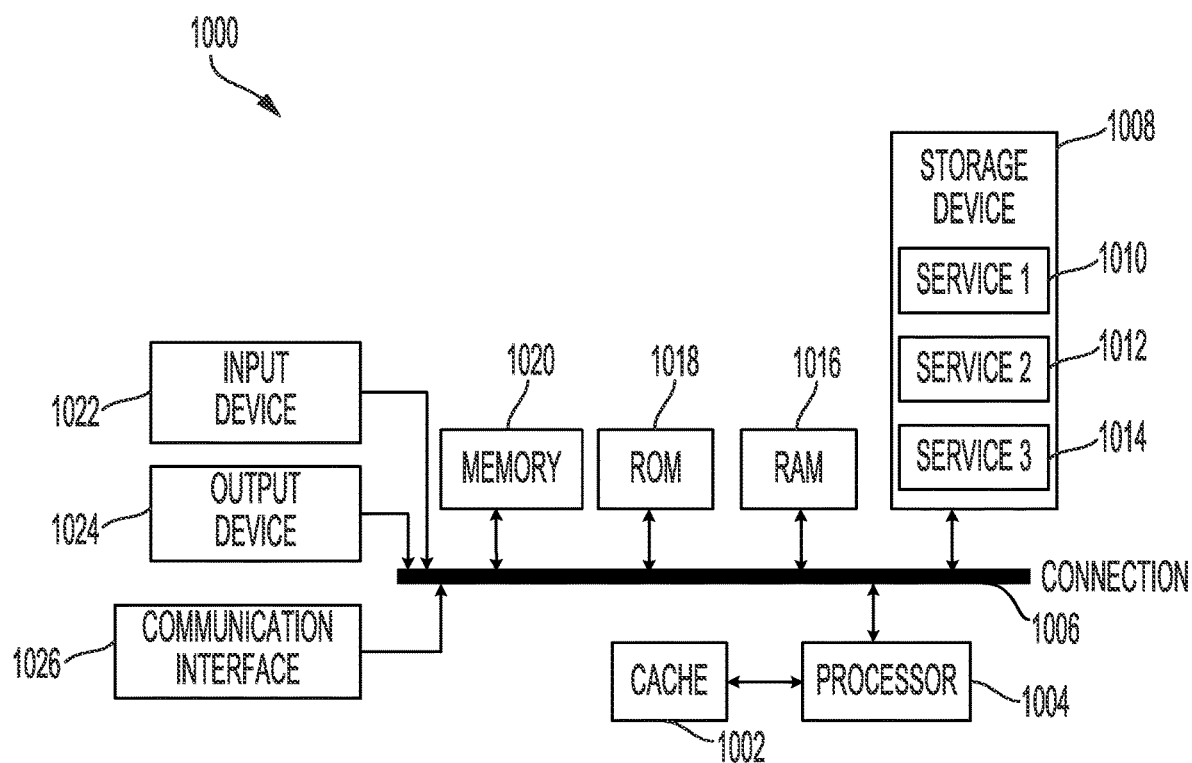
FIG. 10 illustrates a computing system architecture including various components in electrical communication with each other using a connection in accordance with some embodiments.

Disclosed herein are systems, methods and computer-readable storage media for performing path tracing along a network path for MPLS and SR-MPLS networks for both probes and customer data packets. The present technologies will be described in more detail in the following disclosure as follows. The discussion begins with a detailed description of example systems, processes and environments for performing path tracing along a network path for MPLS and SR-MPLS networks, as illustrated in FIGS. 1 through 8. The discussion concludes with a description of an example network and computing devices, as illustrated in FIGS. 9 and 10.

IPv6 Environment

In an IPv6 environment, nodes (e.g., source nodes, midpoint nodes, sink nodes, etc.) can be reached via an IPv6 address or prefix. The IPv6 packets can include an IPv6 header which identifies a source and destination segments for the packets, and may include functions to be applied by one or more segments in the IPv6 header. In some cases, data stored in nodes can also be assigned an IPv6 or prefix, which can be used to identify and access that data. For example, one or more nodes storing a block of data can be assigned an IPv6 prefix, and each instance of the block of data can be assigned an IPv6 address within the IPv6 prefix. The IPv6 address of the block of data can be used to access the block of data. This scheme can ensure that requests for data addressed to an IPv6 address of the data are routed to the appropriate node(s) containing the data and associated with the IPv6 prefix.

Segment Routing (SR)

SR is a source-routing paradigm which allows a packet to follow a predefined path, defined by a list of segments or SR list. The approaches herein leverage SR and IPv6 techniques for accurate and efficient storage operation load balancing and latency reduction.

SR and IPv6 can be leveraged together by implementing an IPv6 header and a SR header (SRH) in a packet. For example, in some cases, an IPv6 extension header can be implemented to identify a list of segments for SR and a counter SegmentsLeft, indicating the number of remaining segments to be processed until the final destination of the packet is reached. In an SR packet, the IPv6 destination address can be overwritten with the address of the next segment in the SR list. This way, the packet can go through SR-unaware routers or nodes until reaching the next intended SR segment or hop. Upon receipt of an SR packet, an SR-aware router or node will set the destination address to the address of the next segment in the SR list, and decrease the Segments Left (SL) counter. When the packet reaches the last SR hop or segment in the SR list, the final destination of the packet is copied to the IPv6 destination address field. Depending on the value of a flag in the header, the SRH can be stripped by the last SR hop or segment so the destination receives a vanilla IPv6 packet.

FIG. 1 shows an illustrative example of an environment 100 in which midpoint compressed data (MCD) is added to a data packet 110 by nodes along a network path 112 and encapsulated for processing by a collector 108 in accordance with at least one embodiment. The environment 100 includes a plurality of nodes that are interconnected through an SRv6 overlay which routes network traffic between these nodes using SRv6. In this example, node 102 represents a source node or ingress point within the network, nodes 104-1-104-N (collectively "104" hereinafter) represent a set of midpoint nodes within the network, and nodes 106-1-106-N (collectively "106" hereinafter) represent a set of sink nodes or egress points within the network.

In an embodiment, a controller can interact with node 102 to collect topology information, perform path computation, propagate routes across the nodes 102-106, propagate segment routing identifiers (SIDs) and policies across the nodes 102-106, perform traffic engineering, and the like. The controller can be, for example, a Border Gateway Protocol (BGP) controller with a path computation engine. The controller can reside within the network illustrated in FIG. 1 or any other network. In an embodiment, the controller can collect topology information from the nodes 102-106 and propagate forwarding rules and SR IDs (e.g., SIDs) and policies using one or more protocols, such as Open Shortest Path First (OSPF), Intermediate System to Intermediate System (IS-IS), BGP Link-State (BGP-LS), BGP Traffic Engineering (BGP-TE), and the like. For example, the controller can collect topology information for nodes 102-106 using the BGP-LS protocol. The controller can also include a path computation engine (PCE) for computing the best paths between the nodes 102-106. The controller can use the collected topology information to perform the path computation. The controller can then use the BGP-TE to populate reachability information, such as forwarding rules and SR IDs and policies, on the nodes 102-106.

The nodes 102-106 can include a control plane that interfaces with BGP-LS and BGP-TE to receive the forwarding rules and SR IDs policies from the controller. The nodes 102-106 can also include a data plane that processes IPv4 and/or IPv6 packets and is able to encapsulate/decapsulate IPv4 or IPv6 packets into SRv6 packets. Moreover, the nodes 102-106 can include BGP agents, such as GoBGP agents, to interact with the controller or any BGP peers. In some cases, the nodes 102-106 can also include an active measurement system based on IP SLA (Internet Protocol Service Level Agreement) to collect network performance information and monitor quality-of-service (QoS) between the nodes 102-106. The nodes 102-106 are SRv6 capable and can route traffic over the SRv6 overlay using SRv6.

In an embodiment, the controller requests the source node 102 to generate a MPLS path tracing probe message 110 that may be used to trace the path of the probe message 110 through the network from an ingress point (e.g., source node 102) to an egress point (e.g., a sink node 106) through one or more midpoint nodes 104. The controller may provide, to the source node 102, the address of the sink node 106-3 that is to serve as the egress point for the probe message, along with a segment-list that indicates the explicit path that is to be traversed from the source node 102 to the designated sink node 106-3. For example, as illustrated in FIG. 1, the explicit path 112 may have the probe message 110 traverse the midpoint node 104-1 towards the sink node 106-3.

The probe message 110 may be generated using a MPLS path tracing (PT) packet format. For instance, as illustrated in FIG. 1, the probe message 110 may include a MPLS stack header 114 that includes an SR-MPLS label stack or MPLS transport label, a "Timestamp, Encapsulate, and Forward" (TEF) network programming or special purpose label, an entropy label indicator (ELI), a structured entropy label (SEL), and a generic associated channel (G-ACH) header. The SR-MPLS label stack or MPLS transport label may carry MPLS to enable transport of the probe message 110 over a best-effort path, Internet Gateway Protocol (IGP) path, or through a SR traffic engineering (SR-TE) path. The TEF network programming label may trigger the path tracing behavior at the designated sink node 106-3. In an embodiment, the TEF network programming label can be encoded before the ELI and SEL labels to ensure that the ELI and SEL labels are not removed on the penultimate hop node along the path 112. In some instances, the TEF label can be encoded after the ELI and SEL labels as a bottom-of-stack (BoS) label. In some instances, another label (e.g., a Virtual Private Network (VPN) label) may be added at the bottom of the stack label. The probe message 110 may also include a synthetic IP or customer data packet 122 that includes other data, such as customer data and the like.

The ELI label may be a standard MPLS special purpose label (e.g., having a value of 4-6, 8-12, etc.) or a general network programming label. The ELI label may carry a specific value (e.g., label value=7). The ELI label may be used to indicate the presence of the SEL within the probe message 110, which is required to be the next label after the ELI label. The SEL may have a general format that may be used to trigger the path tracing behavior at each of the midpoint nodes 104 along the path 112. The SEL may include a slice identifier (SLID) that is used to encode the network slice ID corresponding to the network slice in the MPLS domain. Further, the SEL may include an entropy field, that is used to encode the entropy of the data packet (e.g., probe 110). The SEL may further include a Traffic Class (TC) field and a BoS field, where the BoS field may be set if the SEL is the BoS label of the probe message 110. The SEL, in an embodiment, includes a set of entropy label control (ELC) bits that carry per-packet control bits. The ELC may include a flag defined as a SLID presence indicator (SPI) that indicates that the SEL carries the SLID as well as the entropy value. In some instances, the ELC may use bits from the 3-bit TC field or 20-bit label fields for this purpose. The probe packets may carry more than one SEL in the MPLS header label stack 114. For instance, a midpoint node 104 may copy the ELC field from the received SEL to the new SEL when inserting the new SEL in the MPLS header label stack 114. A midpoint node 104 may scan the entire label stack to identify the PTI if more than one SEL is present in the label stack.

In an embodiment, the SEL includes a path tracing indicator (PTI) within the ELC that can be used to trigger the path tracing behavior at the midpoint nodes 104. The PTI may be used to indicate the presence of path tracing Type-Length-Values (TLVs) within the probe message 110. The PTI may cause the midpoint nodes 104 receiving the probe message 110 to record their midpoint compressed data (MCD) in the MCD stack 136 of the probe message 110, as described in greater detail herein.

The G-ACH header may be used in MPLS to carry Operations, Administration, and Maintenance (OAM) data. The G-ACH header may indicate, to the midpoint nodes 104 receiving the probe message 110, that the probe message 110 is a control data packet, which may prevent the midpoint nodes 104 from parsing the data after the label stack as an IPv4 or an IPv6 data packet. The G-ACH header may also include a version field, which may denote the G-ACH version used. Through the G-ACH header, a new channel type may be defined for path tracing. For instance, the G-ACH header may indicate a format of the message that follows the G-ACH header. This format may be defined as the MCD stack 136 and the source node TLV. Further, the G-ACH header may be modified such that a set of reserved bits within the state are redefined to indicate the size of the MCD stack 136. It should be noted that the use of a G-ACH header is optional and the MCD stack 136 may be provided after the SEL without any G-ACH header.

The MPLS stack header 114 may further a path tracing indicator that can cause the node to shift the previously recorded path tracing data within the MCD stack 136 to generate capacity for the new path tracing data of the node. This new path tracing data may then be inserted into the MCD stack 136 at the newly generated capacity created by shifting the previously recorded path tracing data by a pre-defined number of bits. This set of shifting instructions does not require extending the packet buffer of the probe message 110. Instead, the set of shifting instructions may instruct the node to move the pre-existing data from one offset to another within the MCD stack 136.

In an embodiment, the source node 102 can introduce its path tracing data 118 within the probe message 110. For instance, the source node 102 can include a SRH PT-TLV that is used to carry the path tracing data of the source node 102. The source node data may include an outgoing interface identifier, an outgoing interface load, and a full transmit timestamp. In some instances, the source node 102 also encodes in the SRH PT-TLV the probe message session identifier and the probe message sequence number. The probe message session identifier may be used to co-relate probe messages of the same session. The probe message sequence number may be used to detect any probe message losses. In some instances, the source node 102 may encode additional information to the SRH PT-TLV. Recording of the data to the SRH PT-TLV may be performed using a network processing unit (NPU) or CPU. The source node may also include its node (IPv4 or IPv6) address in the TLV. The node address of the source node is used by the collector to identify the source of the probe packet.

In path tracing, each midpoint node 104 records its path tracing data (referred to herein as "MCD"). The MCD stack 136 may be configured to allocate sufficient capacity to accommodate the MCD of any midpoint nodes 104 along the path 112. In some instances, the MCD of a node is three bytes (24 bits), which are used to include a short interface identifier (e.g., 12 bits), a short timestamp (e.g., 8 bits), and an interface load (e.g., 4 bits). It should be noted that different MCD sizes may be supported. Further, the MCD can include more information in addition to the short interface identifier, the short timestamp, and the interface load. For instance, the 8-bit short timestamp may include a part of the 64-bit Precision Time Protocol v2 (PTPv2) timestamp and may include nanosecond field bits from 28 to 21. The MCD stack 136 may be carried after the SEL without the G-ACH header. Further, the MCD stack 136 may be carried after the BoS label (which may be different from the SEL) without the G-ACH header. Setting the first nibble of the G-ACH header to 0001b allows for avoidance of incorrect hashing for the ECMP on midpoint nodes 104. When the entropy label is used for hashing by the midpoint nodes 104, the G-ACH header need not be added in the packet. The MCD stack 136 may be carried after the BoS label (which may be different from the SEL) with the G-ACH header. As illustrated in FIG. 1, the source node 102 may introduce its path tracing data 118 at the top of the MCD stack 136, leaving a set of empty path tracing data bits 120 after the path tracing data 118. This set of empty path tracing data bits 120 may be utilized by the midpoint node(s) along the path 112 and the sink node 106-3 to provide their path tracing data, as described in greater detail herein.

Once the source node 102 has generated the probe message 110 and has recorded its data within the source node TLV stack, the source node 102 may transmit the probe message 110 to the next hop on the path 112. As noted above, the controller may provide, to the source node 102, the address of the sink node 106-3 that is to serve as the egress point for the probe message 110, along with a segment-list that indicates the explicit path 112 that is to be traversed from the source node 102 to the designated sink node 106-3. From this segment-list, the source node 102 may identify the next hop, which, as illustrated in FIG. 1, may be the midpoint node 104-1.

In response to receiving the probe message 110 from the source node 102, the midpoint node 104-1 may perform a MPLS lookup on the topmost label of the probe message 110 to determine the next hop for the probe message 110 (in this case, sink node 106-3). For instance, the midpoint node 104-1 may evaluate the segment-list in the probe message 110 to identify the next hop for the probe message 110 once the midpoint node 104-1 has added its path tracing data to the probe message 110. As illustrated in FIG. 1, the next hop for the probe message 110 may be the sink node 106-3. However, it should be noted that there may be additional midpoint nodes 104 along the path 112 prior to delivery of the probe message 110 to the sink node 106-3. The midpoint node 104-1, however, may only identify the next hop to ensure that the probe message 110 is transmitted to the proper destination.

In an embodiment, the midpoint node 104-1 may scan the label stack of the probe message 110 to identify the SEL for evaluation. The midpoint node 104-1 may evaluate the ELC field of the SEL to determine whether the PTI flag has been set. As noted above, the PTI flag can be used to trigger the path tracing behavior at the midpoint nodes 104-1. The PTI flag may be used to indicate the presence of path tracing Type-Length-Values (TLVs) within the probe message 110. The path tracing TLVs may cause the midpoint node 104-1 to record its midpoint compressed data (MCD) in the MCD stack 136 of the probe message 110. For instance, the midpoint node 104-1 may compute its MCD and search for the BoS label. The midpoint node 104-1, upon locating the BoS label, may locate the MCD stack 136 and record its MCD (e.g., path tracing data 124) in the MCD stack 136. The MCD of the midpoint node 104-1 may include the timestamp, interface identifier, and interface load of the midpoint node 104-1.

In an embodiment, the midpoint node 104-1 uses a shift and stamp process to record its path tracing data 124 to the MCD stack 136. As noted above, the path tracing instruction included in the MPLS stack header 114 of the probe message 110 can include a set of instructions that, when parsed by a node, can cause the node to shift the previously recorded path tracing data within the MCD stack 136 to generate capacity for the new path tracing data of the node. Accordingly, the midpoint node 104-1 may shift any previously recorded path tracing data (e.g., MCD) from other midpoint nodes by a number of bytes equal to the MCD size such that this number of bytes is available at the top of the MCD stack 136 for insertion of the midpoint node's MCD 124. Thus, every midpoint node 104 along the path 112 may record its MCD to the same position within the MCD stack 136 after shifting the previously recorded MCD from other midpoint nodes by the amount of bytes required for the new MCD. In an alternative example, the midpoint node 104-1 may append its MCD 124 by receiving the offset value in the MCD header, which the midpoint node 104-1 may use to write in the MCD stack 136. The midpoint node 104-1 may update the offset value after writing the MCD 124 in the MCD stack 136 and, subsequently, forward the probe message 110. Optionally, the MCD 124 may be appended at the top of the stack or at the bottom of the stack, making the recordation of the MCD 124 implementation dependent.

Once the midpoint node 104-1 (or a penultimate node along the path 112) records its MCD 124 into the MCD stack 136, the midpoint node 104-1 may transmit the probe message 110 to the sink node 106-3 designated in the topmost label of the probe message 110. In some instances, in the event of ECMP, the midpoint node 104-1 may use the entropy field of the SEL to select the next hop for the probe message 110.

In an embodiment, when the probe message 110 is received at the sink node 106-3, the sink node 106-3 evaluates the probe message 110 to determine whether the probe message 110 includes the TEF network programming label. As noted above, the TEF network programming label may trigger the path tracing behavior at the sink node 106-3. The TEF network programming label may be encoded before the ELI and SEL labels to ensure that the ELI and SEL labels are not removed on the penultimate hop node along the path 112. In some instances, the TEF label can be encoded after the ELI and SEL labels as a bottom-of-stack (BoS) label. In some instances, another label (such as a VPN label) may be encoded as the BoS label.

In an embodiment, the sink node 106-3 is configured with an SR policy (with TEF behavior) that encapsulates received probe messages 110 in SRv6 encapsulation 128 and forwards these to a collector 108. The SRv6 encapsulation 128 may comprise an outer IPv6 header, an SR header (SRH) 138, and an SRH Path Tracing Type-Length-Value (SRH PT-TLV) 140. The SRH PT-TLV 140 may be used to carry the sink node information. The MPLS label stack 130 and the path tracing data (e.g., MCD 124 and source path tracing data 118) in the data packet 126 that is to be transmitted to the collector 108 may include similar elements to that of the probe message 110, namely the MPLS stack 114 with PT instruction and the path tracing data of the various nodes along the path 112. In an embodiment, the TEF network programming label is used as a binding SID to trigger the SR policy encapsulation of the probe message 110.

In an embodiment, the sink node 106-3 can support different encapsulation behaviors for both probe messages 110 and customer data packets. If the received data packet is a probe message 110, the sink node 106-3 may encapsulate the entire probe message 110 using SRv6 encapsulation, resulting in a data packet 126 that includes the SRv6 encapsulation 128, the MPLS label stack 130, the path tracing data 118, 124, and a synthetic IP packet 142. Alternatively, if the received data packet is a customer data packet, the sink node 106-3 may extract the path tracing data 118, 124 from the customer data packet and may encapsulate this data 118, 124 in SRv6 encapsulation 128. The SRv6 encapsulation 128, along with the MPLS label stack 130 and the path tracing data 118, 124 from the customer data packet may be transmitted to the collector. Further, the customer data packet may be forwarded to its intended destination after the MPLS stack and path tracing header are removed from the customer data packet.

Figure 2:
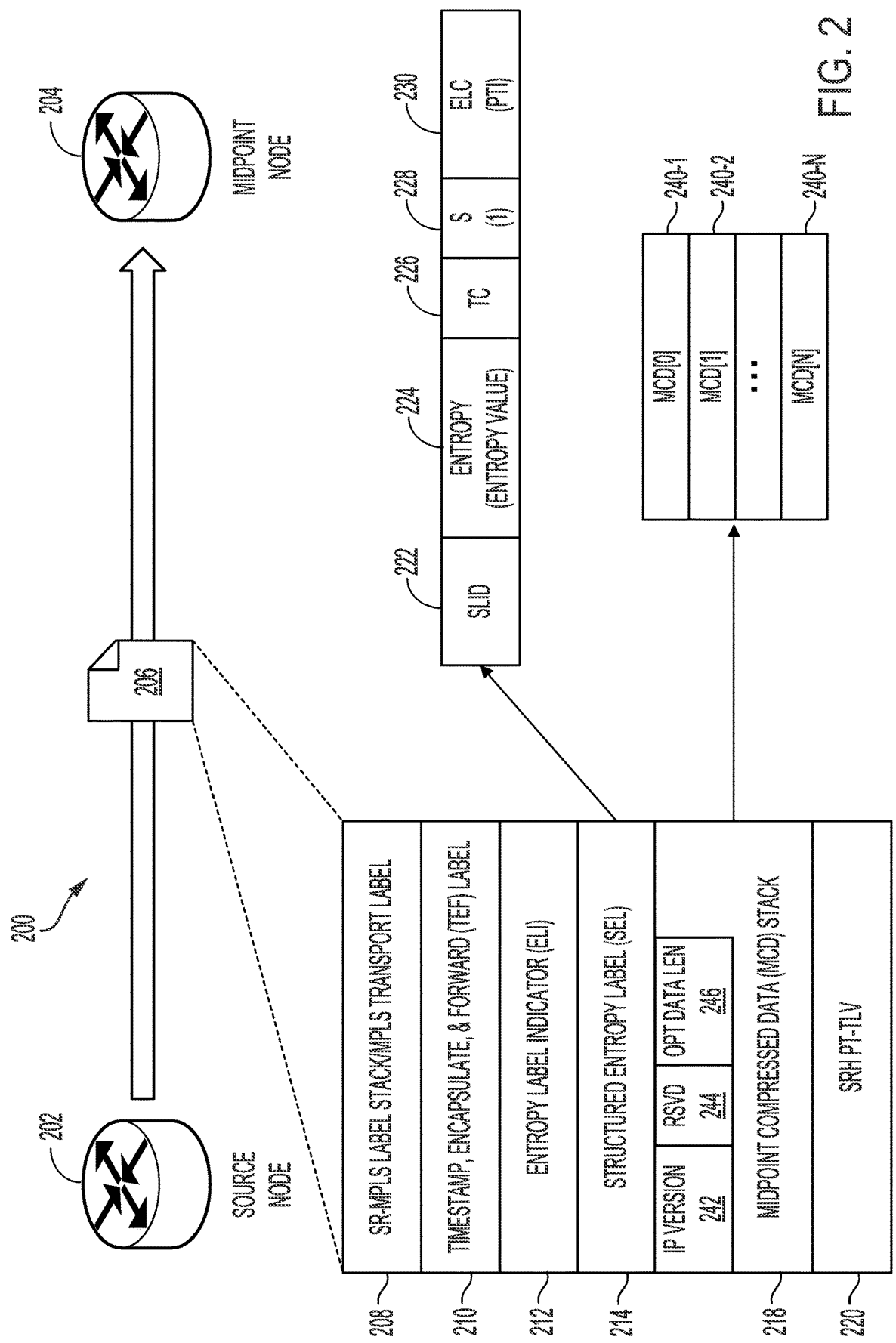
FIG. 2 shows an illustrative example of an environment in which a source node generates a probe that includes instructions for midpoint nodes to add MCD and to initiate a path tracing behavior at a sink node in accordance with at least one embodiment.

FIG. 2 shows an illustrative example of an environment 200 in which a source node 202 generates a probe 206 that includes instructions for midpoint nodes 204 to add MCD 240-1-240-N (collectively "204" hereinafter) and to initiate a path tracing behavior at a sink node in accordance with at least one embodiment. As noted above, a controller may request the source node 202 to generate a probe message 202 that may be used to perform path tracing from the source node 202 to a sink node through one or more midpoint nodes, such as midpoint node 204. The controller may provide, to the source node 202, the address of the destination node (e.g., sink node) that is to serve as the egress point for the probe message 206 and a segment-list (e.g., MPLS label stack) that indicates the explicit path that is to be traversed from the source node 202 to the destination node. Further, the controller may also provide the source node 202 with the different values for the entropy field in the SEL as well as different values for the TC field to be used in the probe messages.

As noted above, the probe message 206 may be generated using MPLS PT packet format. For instance, as illustrated in FIG. 2, the probe message 206 may include a SR-MPLS label stack or MPLS transport label 208, which may carry MPLS to enable transport of the probe message 206 over a best-effort path, IGP low-latency path, or through a SR-TE path. The probe message 206 may further include an TEF network programming label 210, which may be encoded before the ELI label 212 and the SEL label 214 to ensure that the ELI label 212 and the SEL label 214 are not removed on the penultimate hop node along the path. In some instances, the TEF network programming label 210 may be encoded after the ELI label 212 and the SEL label 214 as a BoS label. The TEF network programming label 210 may be used to trigger the path tracing behavior at the sink node, whereby the sink node may encapsulate the probe message 206 and record the full 64-bit receive timestamp, incoming interface identifier, and incoming interface load in the SRv6 encapsulation. The sink node may then forward the SRv6 encapsulation and the probe message 206 to a collector for processing, as described in greater detail herein. The format for the timestamp may be Network Time Protocol version 4 (NTPv4) or Precision Time Protocol version 2 (PTPv2).

The ELI label 212 may be a standard MPLS special purpose label (SPL, reserved in the range 1-14) or extended special purpose label (eSPL, using reserved label value 15 plus another label) that carries a specific value (e.g., special purpose label value=7) to distinguish the ELI label 212 from other labels. The ELI label 212 may be a network programming label defined by the operator or reserved by an IETF standard. The ELI label 212 may be used to indicate the presence of the SEL label 214 within the probe message 206, which may be required to be the next label after the ELI label 212, as illustrated in FIG. 2. The SEL label 214 may have a general format that may be used to trigger the path tracing behavior at the midpoint node 204 and any subsequent midpoint nodes along the path. Further, the SEL label 214 may include a SLID 222 that is used to encode the network slice ID corresponding to the network slice in the MPLS domain. The SLID 222 within the SEL label 214 may occupy 8 bits of the SEL label 214. However, the size of the SLID 222 within the SEL label 214 may be changed according to the deployment used.

The SEL label 214 may include an entropy field 224 that is used to encode the entropy of the probe message 206. The entropy field 224 may occupy 12 bits of the SEL label 214. However, like the SLID 222, the size of the entropy field 224 may be changed according to the deployment used. Further, if a SLID presence indicator (SPI) bit within the ELC field 230 of the SEL label 214 is not set, the entropy field 224 may occupy the original 12 bits allocated to the entropy field 224 and the 8 bits allocated to the ELC field 230.

The SEL label 214 may further include a traffic control field 226, which may occupy 3 bits of the SEL label 214. The TC field 226 may be used to carry traffic class information. The BoS field 228 of the SEL label 214 may be used to denote whether the SEL label 214 is a BoS label. For instance, if the bit allocated for the BoS field 228 is set to "1", then the SEL label 214 is designated as a BoS label.

The SEL label 214 may further include an ELC field 230 that may carry per-packet control bits. The ELC field 230 may include a flag defined as a SPI that may be used to indicate whether the SEL label 214 carries the SLID as well as the entropy value. If the SPI bit within the ELC field 230 is not set (e.g., SPI bit is not equal to "1"), the entropy field 224 may use the bits allocated to the ELC field 230. In some instances, the ELC field 230 may utilize bits from the traffic control field 226. In an embodiment, a new flag is defined in the ELC field 230, which may be defined as the path tracing indicator or PTI. The PTI flag in the ELC field 230 may be set by the source node 202 to trigger the path tracing behavior at each of the midpoint nodes along the path, including midpoint node 204. The PTI flag may be used to indicate the presence of path tracing TLVs within the probe message 206. The path tracing TLVs may cause the midpoint nodes receiving the probe message 206 to record their MCD in the MCD stack 218 of the probe message 206.

The probe message 206 may optionally include a G-ACH header, which may be used in MPLS to carry OAM data. The G-ACH header may indicate, to the midpoint nodes receiving the probe message 206, that the probe message 206 is a control data packet, which may prevent the midpoint nodes from parsing the data after the label stack as an IPv4 or an IPv6 data packet. For instance, the first four bits of the G-ACH header may denote the packet type of the probe message 206. This packet type field may be set to a value (e.g., "0001") that indicates that the probe message 206 is a control data packet. This field may also be set to "0000," "0010," or any other appropriate value that avoids conflicts with the values 0x4 and 0x6 used for the IP version number. Setting the first nibble of the G-ACH header to "0001b" allows for avoidance of incorrect hashing for ECMP on the midpoint nodes 204. When the SEL 214 is used for hashing by the midpoint nodes 204, the G-ACH header does not need to be added in the packet. This is also the case when the scheme is used for customer data traffic instead of probe messages, as customer data traffic does not include G-ACH headers.

The G-ACH header may further include a version field, which may be used to denote the G-ACH version being used. The version field may occupy four bits of the G-ACH header and may be set to 0. The reserved field of the G-ACH header may occupy 8 bits of the G-ACH header and may usually be unused. However, in an embodiment, the bits corresponding to the reserved field can be redefined to indicate the size of the MCD stack 218. The size of the MCD stack 218 may correspond to the size of the MCD that is to be added to the MCD stack 218 by the various midpoint nodes along the path.

The G-ACH header may include a channel type field, which may be used to denote the type of channel used. Further, the channel type field may be used to define the format of the message that comes after the G-ACH header. The channel type field may occupy 16 bits of the G-ACH header. In an embodiment, the channel type defined via the channel type field may be set to path tracing such that the format of the message which follows the G-ACH header is the MCD stack 218 and the SRH PT-TLV 220. It should be noted that the use of the G-ACH header may be optional, whereby the MCD stack 218 may be carried immediately after the SEL label 214 with no G-ACH header.

The MCD stack 218 of the probe message 206 may be implemented to accommodate the MCD of the source node 202, any midpoint nodes along the path, and the sink node. As noted above, the MCD stack 218 may be configured to accommodate the MCD that is to be added by the one or more midpoint nodes along the path. Thus, the MCD stack 218 may include a number of MCD offsets 240-1-240-N (collectively "240" herein) for insertion of the MCD of each midpoint node along the path. In an embodiment, an MCD inserted into an MCD offset 240-1 may utilize three bytes (24-bit encoding), which are used to include a short interface identifier (12 bits), a short timestamp (8 bits), and an interface load (4 bits). It should be noted that different MCD sizes may be supported. Further, the MCD can include more information in addition to the short interface identifier (e.g., 12-bit), the short timestamp (e.g., 8-bit), and the interface load (e.g., 4-bit). As noted above, the MCD stack 218 may be carried after the SEL label 214 without the G-ACH header or any other BoS label without the G-ACH header.

The MCD stack 218 may include an IP version field 242, which may be used to denote the IP version number (e.g., 0x1 or 0x2). Further, the MCD stack 218 may include a reserved field 244 that may usually be unused. However, in an embodiment, the bits corresponding to the reserved field 244 can be redefined to indicate the type of the packet carried after the path tracing data. As noted above, the size of the MCD stack 218 may correspond to the size of the MCD that is to be added to the MCD stack 218 by the various midpoint nodes along the path. The MCD stack 218 may further include an optional data length field 246, which may be used to define the length of the MCD stack 218. In some instances, the MCD stack 218 may optionally include a type field between the reserved field and the optional data length field 246, which may be used to denote the packet type as described above.

In an embodiment, in the SR-MPLS label stack or MPLS transport label 208 of the probe message 206, the source node 202 may include a set of instructions that, when parsed by a node (such as midpoint node 204), can cause the node to shift the previously recorded path tracing data within the MCD stack 218 to allow for recording of the new path tracing data of the node at the top of the MCD stack 218. For example, if the midpoint node 204 records its path tracing data at MCD[0], a subsequent midpoint node may shift this path tracing data to MCD[1] and then record its own path tracing data into the now empty MCD[0]. This set of shifting instructions does not require extending the packet buffer of the probe message 206. Instead, the set of shifting instructions may instruct the node to move the pre-existing data from one offset to another within the MCD stack 218.

The probe message 206 may further include a SRH PT-TLV 220 that is used to carry the path tracing data of the source node 202. The source node path tracing data may include an outgoing interface identifier, an outgoing interface load, and a full transmit timestamp. In some instances, the source node 202 may also encode in the SRH PT-TLV 220 the probe message session identifier and the probe message sequence number. The probe message session identifier may be used to co-relate probe messages of the same session. The probe message sequence number may be used to detect any probe message losses. The source node 202 may further encode additional information to the SRH PT-TLV 220, such as a source node (IPv4/IPv6) address.

The source node 202 may transmit the probe message 206 to the next hop in the path (e.g., midpoint node 204) once the source node 202 has recorded its data within the SRH PT-TLV 220 of the probe message 206. For instance, the source node 202 may use the segment-list provided by a controller to identify the next hop for the probe message 206 and transmit the probe message 206 to this next hop for processing and insertion of its MCD.

Figure 3:
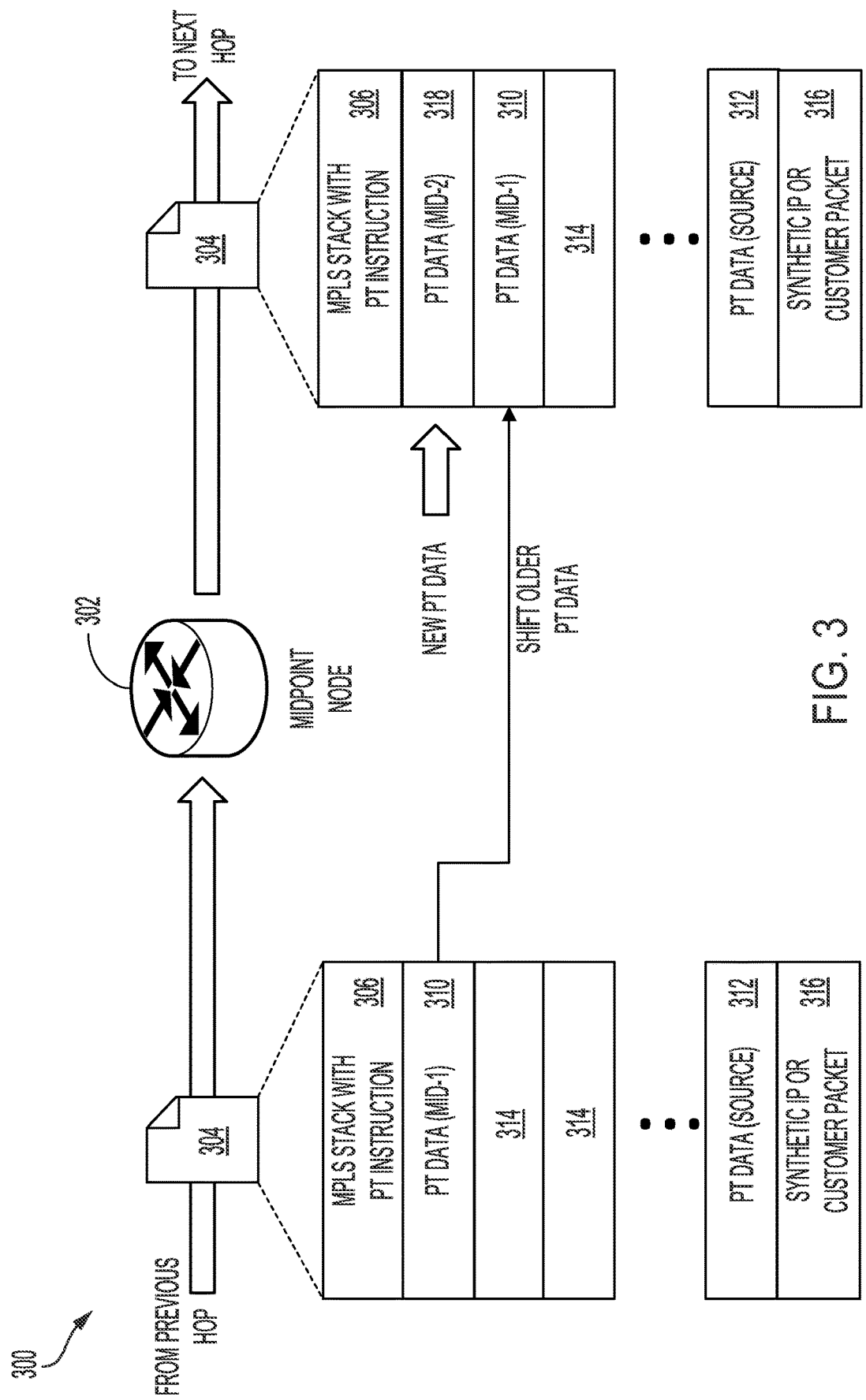
FIG. 3 shows an illustrative example of an environment in which a midpoint node performs a shift and stamp procedure to add the MCD of the midpoint node to a path tracing probe in accordance with at least one embodiment.

FIG. 3 shows an illustrative example of an environment 300 in which a midpoint node 302 performs a shift and stamp procedure to add the MCD of the midpoint node 302 to a path tracing probe message 304 in accordance with at least one embodiment. In the environment 300, a midpoint node 302 may receive a probe message 304 from a previous hop. For instance, the midpoint node 302 may be one of multiple midpoint nodes along a path through which a probe message 304 is being transmitted from a source node to a sink node for path tracking purposes. In some instances, the midpoint node 302 may be the next hop from a source node that generated the probe message 304. Additionally, or alternatively, the midpoint node 302 may be the penultimate hop along the path, whereby the next hop is the sink node. As illustrated in FIG. 3, and as described in greater detail herein, the midpoint node 302 receives the probe message 304 from another midpoint node, which has recorded its MCD 310 into the MCD stack of the probe message 304. Further, the MCD stack may include the path tracing data 312 of the source node, such as in a SRH PT-TLV, as described above. Further, the probe message 304 may optionally include a synthetic IP or customer data packet 316 that includes other data, such as customer data and the like.

As noted above, the probe message 304 may include a MPLS stack header 306 that includes a PT instruction. The MPLS stack header 306 may include an SR-MPLS label stack or MPLS transport label, a TEF network programming label, an ELI label, a SEL label, and (optionally) a G-ACH header. The SEL label may have a general format that may be used to trigger the path tracing behavior at each of the midpoint nodes along the path. For instance, the SEL label may include a PTI flag within the ELC field that can be used to trigger the path tracing behavior at the midpoint nodes. The PTI may be used to indicate the presence of path tracing TLVs within the probe message 304. The path tracing TLVs may cause the midpoint nodes receiving the probe message 304 to record their MCD in the MCD stack of the probe message 304.

In response to receiving the probe message 304, the midpoint node 302 perform a MPLS lookup on the topmost label of the probe message 304 to identify the next hop for the probe message 304. Additionally, the midpoint node 302 may scan the label stack of the probe message 304 to identify the SEL label for evaluation. The midpoint node 302 may evaluate the ELC field of the SEL label to determine whether the PTI flag has been set. As noted above, the PTI flag can be used to trigger the path tracing behavior at the midpoint nodes, including midpoint node 302. The PTI flag may be used to indicate the presence of path tracing TLVs within the probe message 304. The path tracing TLVs may cause the midpoint node 302 to record its MCD in the MCD stack of the probe message 304. For instance, the midpoint node 302 may compute its MCD and search for the BoS label. The midpoint node 302, upon locating the BoS label, may locate the MCD stack and record its MCD (e.g., path tracing data 318) in the MCD stack.

The MPLS stack header 306 may optionally include instructions for each other node along the path on what path tracing data is to be recorded in the probe message 304 as MCD. Additionally, the MPLS stack header 306 may include a set of instructions that, when parsed by the midpoint node 302, may cause the midpoint node 302 to shift the previously recorded path tracing data 310 by a number of bytes equal to the MCD size such that this number of bytes is available at the top of the MCD stack for insertion of the path tracing data 318 of the midpoint node 302. For example, as illustrated in FIG. 3, the midpoint node 302 may shift the prior midpoint node path tracing data 310 such that a number of bytes at the top of the MCD stack are available for the path tracing data 318 of the midpoint node 302. Subsequently, the midpoint node 302 may record its path tracing data 318 at the top of the MCD stack, above the prior midpoint node path tracing data 310. The set of empty path tracing data bits 314 within the probe message 304 may be reduced such that the remaining set corresponds to the number of remaining midpoint nodes along the path. This remaining set of empty path tracing data bits 314 may be utilized by any midpoint node(s) along the path to provide their path tracing data.

Once the midpoint node 302 records its MCD (e.g., path tracing data 318) into the MCD stack, the midpoint node 302 may transmit the probe message 304 to the next hop designated in the topmost label of the probe message 302. In some instances, in the event of ECMP, the midpoint node 302 may use the entropy field of the SEL label to select the next hop for the probe message 304.

Figure 4:
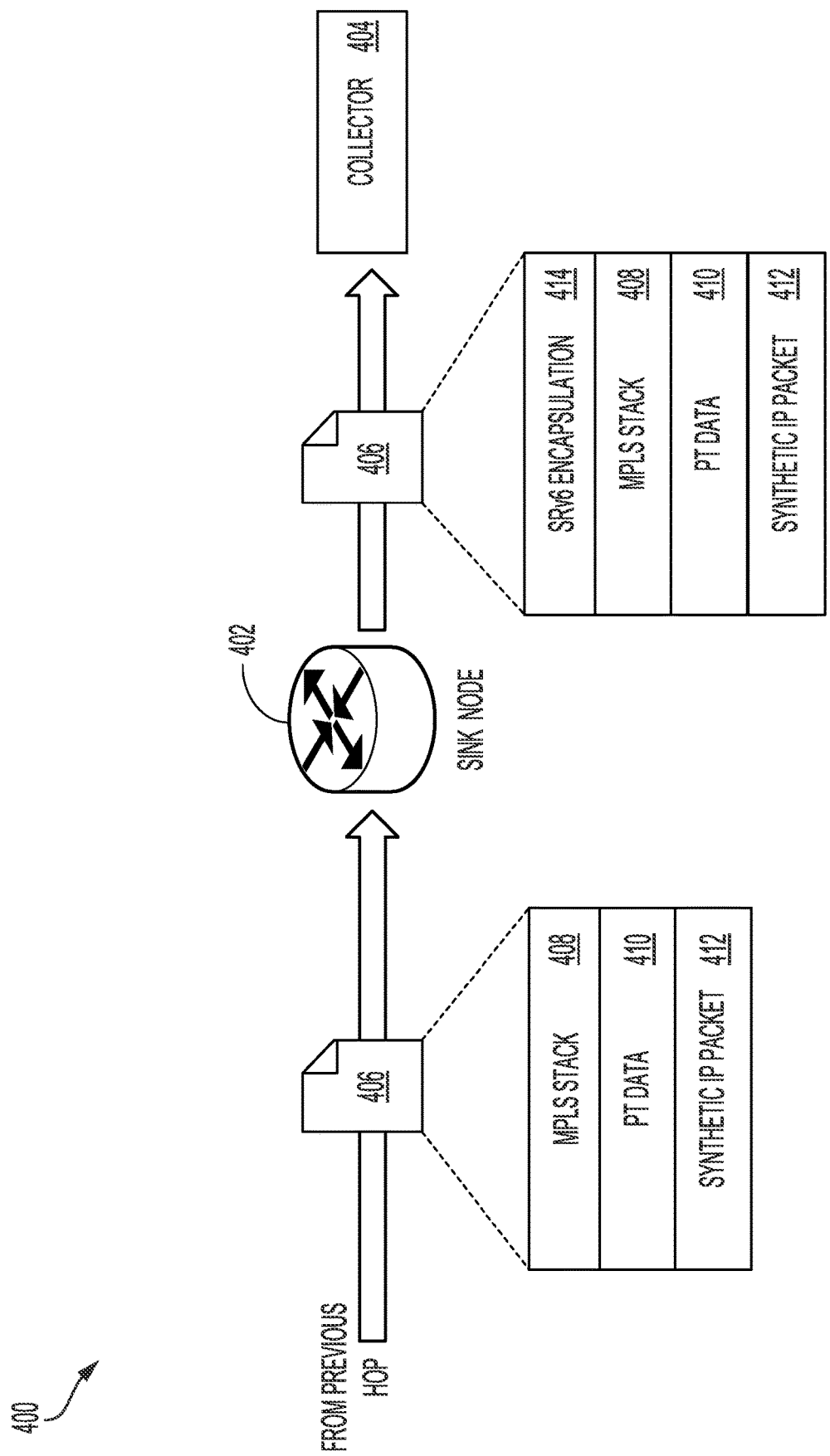
FIG. 4 shows an illustrative example of an environment in which a sink node encapsulates a data packet for delivery to a collector in accordance with at least one embodiment.

FIG. 4 shows an illustrative example of an environment 400 in which a sink node 402 encapsulates a data packet for delivery to a collector 404 in accordance with at least one embodiment. In the environment 400, a sink node 402 may receive a probe message 406 from a previous hop (e.g., a midpoint node) along a network path. As noted above, the probe message 406 may include a MPLS stack 408 and path tracing data 410. The MPLS stack 408 and the path tracing data 410 may include the MPLS stack header and path tracing data of the various nodes along the path, as noted above. For instance, the probe message 406 may include an SR-MPLS label stack or MPLS transport label, a TEF network programming label, an ELI label, a SEL label, and (optionally) a G-ACH header. The probe message 406 may also optionally carry a synthetic IP data packet 412, as illustrated in FIG. 4.

In an embodiment, the sink node 402 evaluates the probe message 406 to determine whether the probe message 406 includes the TEF network programming label, which may trigger the path tracing behavior at the sink node 402, as described herein. As noted above, the TEF label may be used as a binding SID that is used to trigger the configured SR policy encapsulation of the probe message 406. In some instances, the TEF behavior of the SR policy is performed using a NPU in the fast data path. This may allow the sink node 402 to forward probe messages at line rate performance to the collector 404. The probe message 406, in this instance, may not be punted to the control-plane or slow-path to avoid creating CPU bottlenecks for scale. This may avoid the control-plane or slow-path injecting the updated data packet back into the forwarding plane.

In an embodiment, the sink node 402 is configured with a SR policy that is implemented in the event that the probe message 406 includes the TEF network programming label. The SR policy may be used to encapsulate received probe messages (e.g., probe message 406) in SRv6 encapsulation 414 and to forward this SRv6 encapsulation 414 to the collector 404 for processing. The SRv6 encapsulation 414 may comprise an outer IPv6 header, a SRH, and an SRH-TLV. The SRH-TLV may be used to carry the sink node information. This sink node information may include the timestamp, interface identifier, and the interface load of the sink node 402.

As illustrated in FIG. 4, the probe message 406 is received with a synthetic IP data packet 412. Thus, the sink node 402 may encapsulate the entire probe message 406 including the received MPLS header and label stack using SRv6 encapsulation 414, resulting in the probe message 406 including the SRv6 encapsulation 414, the MPLS label stack 408, and the path tracing data 410. The sink node 402 may transmit this probe message 406 with the SRv6 encapsulation 414 to the collector 404. In response to receiving the probe message 406 with the SRv6 encapsulation 414, the collector 404 may parse the probe message 406 and trace the path of the probe message 406 using a network topology database. Further, the collector 404 may reconstruct full 64-bit timestamps from the timestamps recorded at the midpoint nodes along the path and full timestamps recorded at the source node and the sink node 402. The collector 404 may additionally compute the hop-by-hop and end-to-end delay along the path.

Figure 5:
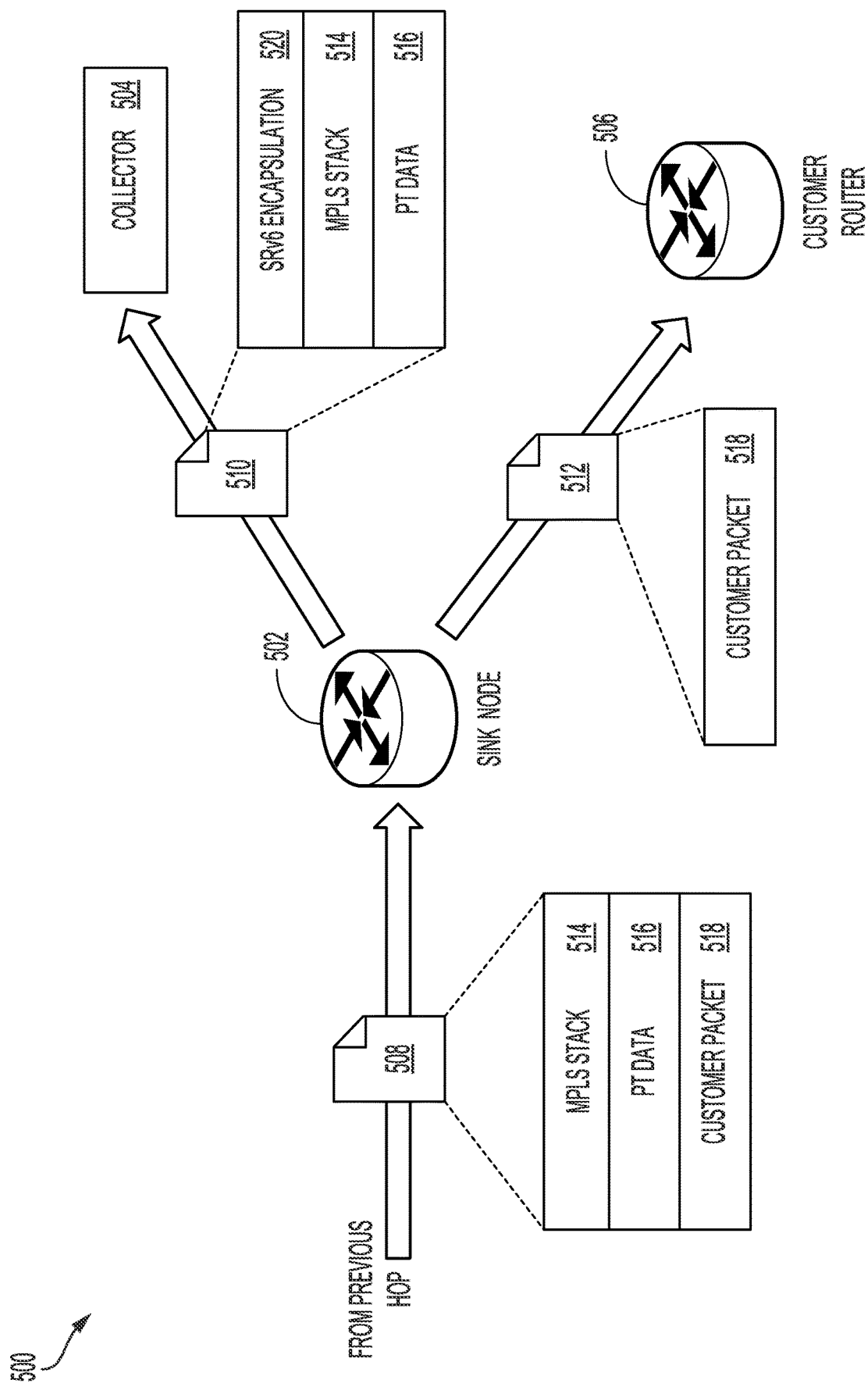
FIG. 5 shows an illustrative example of an environment in which a sink node extracts the path tracing headers from a data packet and encapsulates the path tracing headers for delivery to a collector in accordance with at least one embodiment.

As noted above, the sink node can support different encapsulation behaviors for both probe messages and customer data packets that include probe messages. For example, as illustrated in FIG. 5 through the environment 500, the sink node 502 may receive a data packet 508 that includes a MPLS stack 514, path tracing data 516, and the remainder of the customer data packet 518. In the environment 500, the sink node 502 may evaluate the data packet 508 to determine whether the data packet 508 includes an TEF network programming label. Further, the sink node 502 may evaluate the data packet 508 to determine whether the data packet 508 is a standalone probe message or a customer data packet that includes the probe message. In the example illustrated in FIG. 5, the data packet 508 is a customer data packet that includes the probe message. For the data packet 508, in this example, a different value of TEF in the TEF network programming label is used to distinguish the behavior on the sink node 502 between customer data packets and probe messages. The G-ACH header may not be used with customer data traffic as opposed to probe messages, as customer data traffic may use ECMP hashing based on the entropy label. The scheme may this ensure that probe packets follow the customer data traffic being traced.

In an embodiment, the sink node 502 may extract the MPLS stack 514 and the path tracing data 516 from the data packet 508 and use SRv6 encapsulation 520 to encapsulate the MPLS stack 514 and the path tracing data 516. As with the sink node 402 described above in connection with FIG. 4, the SRv6 encapsulation 520 may comprise an outer IPv6 header, a SRH, and a SRH-TLV. The SRH-TLV may be used to carry the sink node information, which may include the timestamp, interface identifier, and the interface load of the sink node 502. The SRv6 encapsulation 520, as well as the MPLS stack 514 and path tracing data 516 may be transmitted as a new data packet 510 to the collector 504 for processing, as described above.

In addition to transmitting the new data packet 510 to the collector 504 for processing of the probe message (e.g., SRv6 encapsulation 520, MPLS stack 514, and path tracing header 516), the sink node 502 may forward the customer data packet 518 minus the MPLS stack 514 and path tracing data 516 in the form of a data packet 512 to the intended destination, such as a customer router 506. Thus, path tracing may be applied to customer data packets to allow the collector 504 to obtain path tracing data from the various nodes along a path and compute the hop-by-hop and end-to-end delay along the path. As noted above, a different value of TEF in the TEF network programming label is used to distinguish the behavior on the sink node 502 between customer data packets and probe messages.

Figure 6:
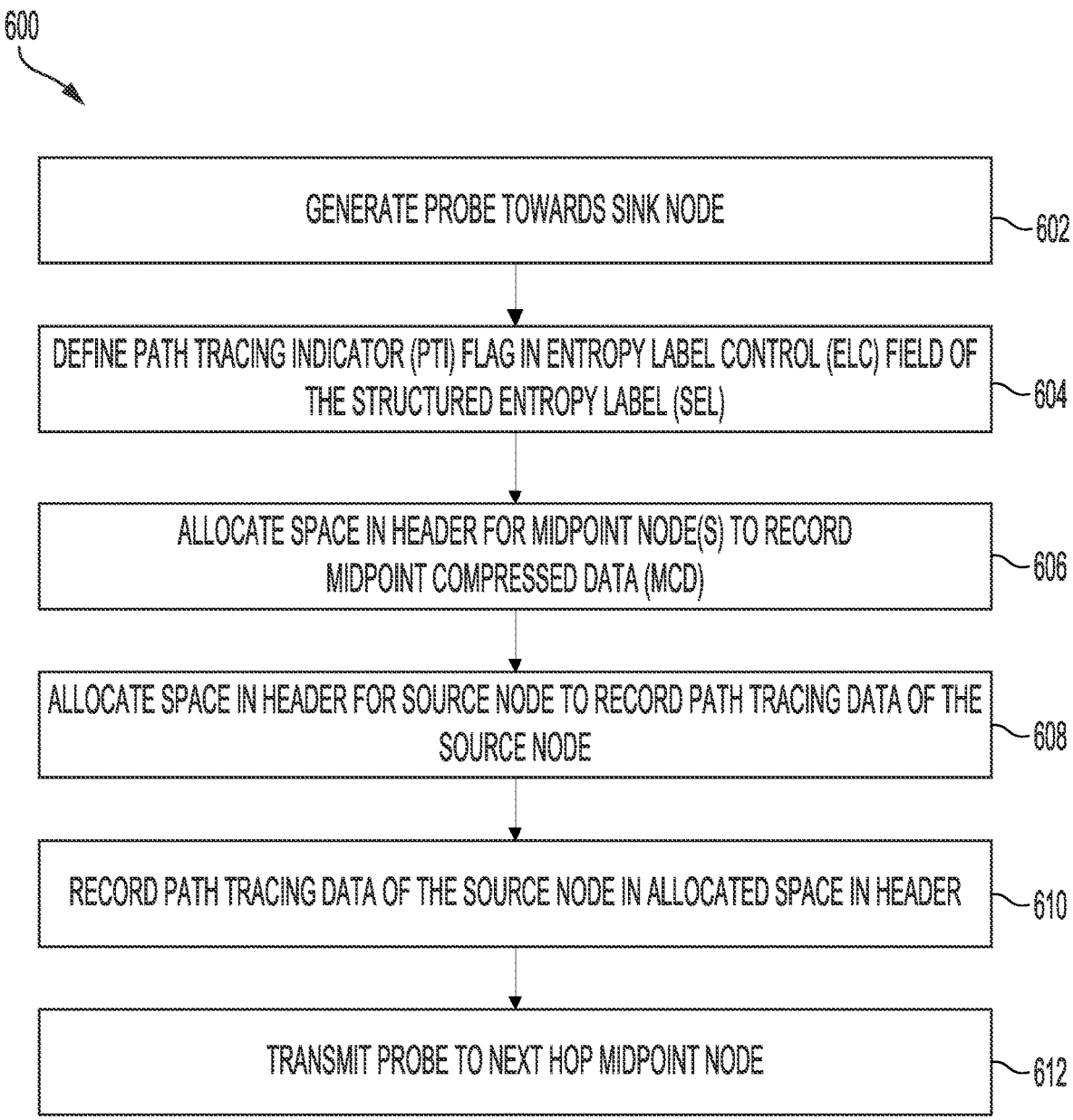
FIG. 6 shows an illustrative example of a process for generating a probe including instructions for midpoint and sink nodes to add MCD and to provide the probe to a collector for processing in accordance with at least one embodiment.

FIG. 6 shows an illustrative example of a process 600 for generating a probe message including instructions for midpoint nodes to add MCD, for a sink node to add its path tracing data, and to provide the probe to a collector for processing in accordance with at least one embodiment. The process 600 may be performed by a source node within a network. As noted above, a controller may request the source node to generate a MPLS path tracing probe message that may be used to trace the path of the probe message through a network from an ingress point (e.g., source node) to an egress point (e.g., sink node) through one or more midpoint nodes. The controller may provide, to the source node, the network address of the sink node that is to serve as the egress point for the probe message, along with a segment-list that indicates the explicit path that is to be traversed from the source node to the designated sink node. Thus, in response to this request, the source node may generate the probe message towards the sink node at step 602.

At step 604, the source node may define a PTI flag in the ELC field of the SEL label in the probe message. As noted above, the probe message may include a MPLS stack header that includes an SR-MPLS label or MPLS transport label, a TEF network programming label, an ELI label, a SEL label, and (optionally) a G-ACH head. The SEL label may include a SLID that is used to encode the network slice ID corresponding to the network slice in the MPLS domain. Further, the SEL label may include an entropy field, that is used to encode the entropy of the probe message. The SEL label may further include a traffic control field and a BoS field, where the BoS field may be set if the SEL label is the BoS label of the probe message. The SEL label, in an embodiment, includes a set of ELC bits that carry per-packet control bits. The ELC may include a flag defined as an SPI that indicates that the SEL label carries the SLID as well as the entropy value. Additionally, the SEL label may include a PTI within the ELC field that can be used to trigger the path tracing behavior at the midpoint nodes. The PTI may be defined to indicate the presence of path tracing TLVs within the probe message. The path tracing TLVs may cause the midpoint nodes receiving the probe message to record their MCD in the MCD stack of the probe message.

In some instances, the source node may set the G-ACH header to indicate to the midpoint nodes along the path that the message probe is a control packet. As noted above, the G-ACH header may indicate, to the midpoint nodes receiving the probe message, that the probe message is a control data packet in order to prevent the midpoint nodes from parsing the data after the label stack as an IPv4 or an IPv6 data packet. The source node may set the first four bits of the G-ACH header to denote the packet type of the probe message. For instance, this packet type field may be set to a value (e.g., "0001") that indicates that the probe message is a PT data packet. This field may also be set to "0000," "0010," or any other appropriate value that avoids conflicts with the values 0x4 and 0x6 used for the IP version number. Setting the first nibble of the G-ACH header to "0001b" allows for avoidance of incorrect hashing for ECMP on the midpoint nodes. The source node may further set the channel type as "PT" or path tracing. As noted above, the G-ACH header in the probe message may include a channel type field, which may be used to denote the type of channel used. Further, the channel type field may be used to define the format of the message that comes after the G-ACH header. In an embodiment, the channel type defined via the channel type field may be set to "PT" or path tracing such that the format of the message which follows the G-ACH header is the MCD stack and the source node TLV. When the SEL is used for hashing by the midpoint nodes, the G-ACH header does not need to be added in the packet. This is also the case when the scheme is used for customer data traffic instead of probe messages, as customer data traffic does not include G-ACH headers. Thus, setting the G-ACH header may be optional.

At step 606, the source node may allocate space in the header for the one or more midpoint nodes to record their respective MCD. This allocated space may comprise the MCD stack, which may be configured to allocate sufficient capacity to accommodate the MCD of the source node, the one or more midpoint nodes along the path, and the sink node. In some instances, the MCD of a node is three bytes, which are used to include a short interface identifier (12 bits), a short timestamp (8 bits), and an interface load (4 bits). It should be noted that different MCD sizes may be supported. Further, the MCD can include more information in addition to the short interface identifier, the short timestamp, and the interface load. The MCD stack may be carried after the SEL label without the G-ACH header.

At step 608, the source node may allocate space in the header for the source node to record its path tracing data. For instance, the source node can include a SRH PT-TLV that is used to carry the path tracing data of the source node. The source node path tracing data may record, at step 610, its path tracing data into the allocated space. The path tracing data of the source node may include an outgoing interface identifier, an outgoing interface load, and a full transmit timestamp. In some instances, the source node also encodes in the SRH PT-TLV the probe message session identifier and the probe message sequence number. The probe message session identifier may be used to co-relate probe messages of the same session. The probe message sequence number may be used to detect any probe message losses. In some instances, the source node may encode additional information to the SRH PT-TLV. Recording of the data to the SRH PT-TLV may be performed using a NPU or CPU. The source node may also include its node (IPv4 or IPv6) address in the SRH PT-TLV or in a new TLV. The node address of the source node is used by the collector to identify the source of the probe packet.

At step 612, the source node may transmit the probe message to the next hop midpoint node. As noted above, the controller may provide, to the source node, the address of the sink node that is to serve as the egress point for the probe message, along with a segment-list that indicates the explicit path that is to be traversed from the source node to the designated sink node. From this segment-list, the source node may identify the next hop, which may be a particular midpoint node. Accordingly, the source node may transmit the probe message to this midpoint node.

Figure 7:
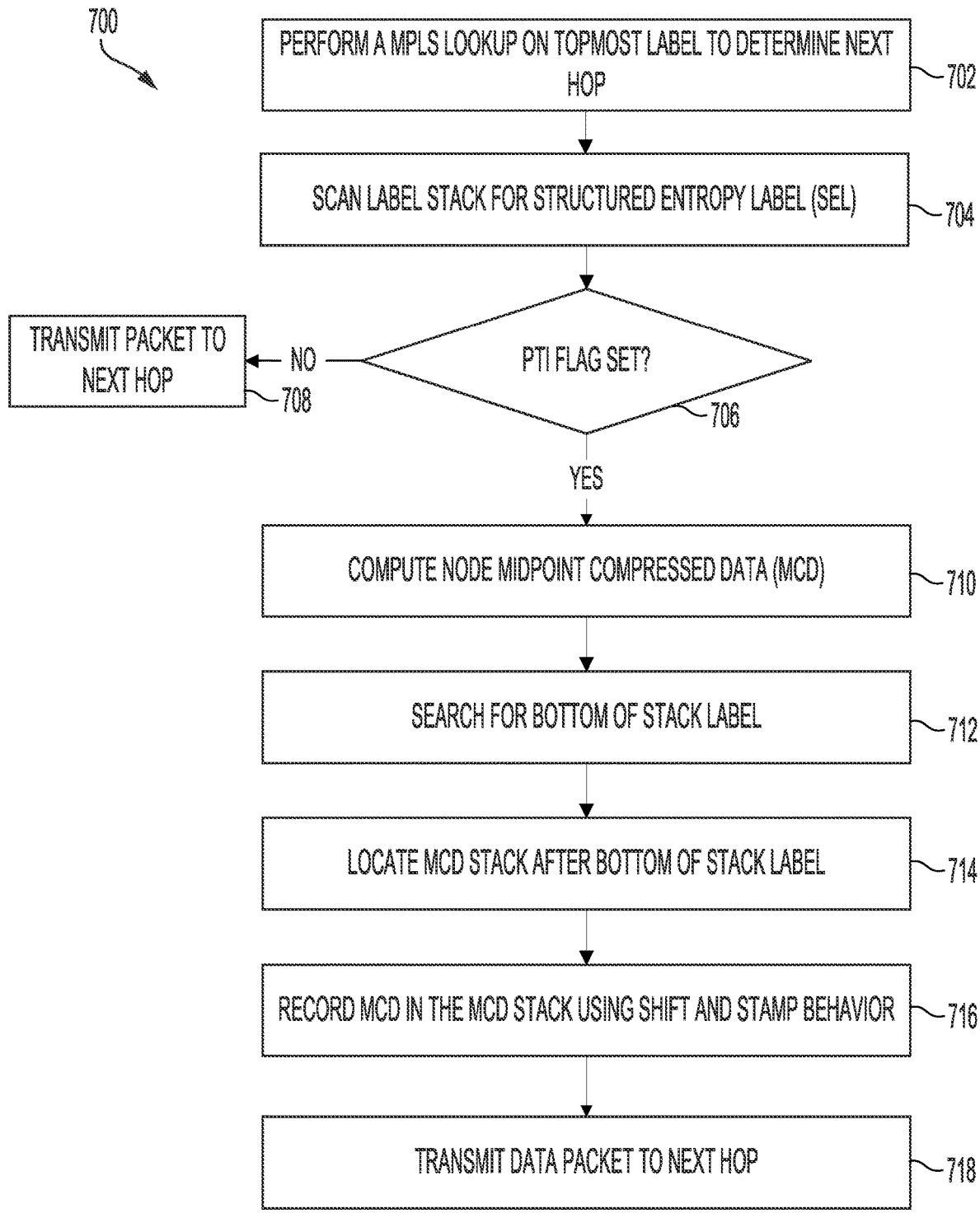
FIG. 7 shows an illustrative example of a process for performing a shift and stamp procedure to add MCD to a probe in accordance with at least one embodiment.

FIG. 7 shows an illustrative example of a process 700 for performing a shift and stamp procedure to add MCD to a probe in accordance with at least one embodiment. The process 700 may be performed by any midpoint node along a network path that receives a data packet from a previous hop node (e.g., a source node, another midpoint node, etc.). At step 702, the midpoint node may perform a MPLS lookup on the topmost label of the probe message to determine the next hop. As noted above, the probe message may include a MPLS stack with PT instruction. The MPLS stack may include an SR-MPLS label or MPLS transport label, an TEF network programming label, an ELI label, a SEL label, and (optionally) a G-ACH header. From the SR-MPLS label or MPLS transport label, the midpoint node may use the segment-list defined therein to identify the next hop.

At step 704, the midpoint node may scan the label stack to identify the SEL label for evaluation. As noted above, the SEL label may have a general format that may be used to trigger the path tracing behavior at the midpoint node and any subsequent midpoint nodes along the path. For instance, the SEL label may include an ELC field that may carry per-packet control bits. The ELC field may include a flag defined as a SPI that may be used to indicate whether the SEL label carries the SLID as well as the entropy value. If the SPI bit within the ELC field is not set, the entropy field may use the bits allocated to the ELC field. In some instances, the ELC field may utilize bits from the traffic control field. In some instances, a new flag is defined in the ELC field, which may be defined as the PTI. The PTI flag in the ELC field may be set by the source node to trigger the path tracing behavior at each of the midpoint nodes along the path. The PTI flag may be used to indicate the presence of path tracing TLVs within the probe message. The path tracing TLVs may cause the midpoint nodes receiving the probe message to record their MCD in the MCD stack of the probe message. Thus, at step 706, the midpoint node may determine whether this PTI flag has been set.

If the PTI flag is not set within the ELC field of the SEL label (or the PTI flag is not defined), the midpoint node may, at step 708, transmit the data packet to the next hop, as indicated in the SR-MPLS label stack or MPLS transport label. However, if the PTI flag has been set, the midpoint node, at step 710, may compute the MCD of the midpoint node. As noted above, the PTI flag can be used to trigger the path tracing behavior at the midpoint nodes, including midpoint node. The PTI flag may be used to indicate the presence of path tracing TLVs within the probe message. The path tracing TLVs may cause the midpoint node to record its MCD in the MCD stack of the probe message. The MCD of the midpoint node may comprise three bytes, which are used to include a short interface identifier (12 bits), a short timestamp (8 bits), and an interface load (4 bits). It should be noted that different MCD sizes may be supported. Further, the MCD can include more information in addition to the short interface identifier, the short timestamp, and the interface load. For example, the MCD can include node addresses/identifiers and packet counters.

At step 712, the midpoint node may search for the BoS label. As noted above, the MCD stack, where the newly computed MCD is to the recorded, may be located after the BoS label of the probe message. Thus, once the midpoint node has identified the BoS label, the midpoint node, at step 714, may locate the MCD stack after the BoS label.

At step 716, the midpoint node may record its MCD in the MCD stack using a shift and stamp behavior. As noted above, the MPLS stack in the probe message may include PT instructions for each node along a path regarding what path tracing data is to be recorded in the probe message as MCD. Further, the MPLS stack may include a set of instructions that, when parsed by the midpoint node, may cause the midpoint node to shift the previously recorded path tracing data by a number of bytes equal to the MCD size such that this number of bytes is available at the top of the MCD stack for insertion of the path tracing data of the midpoint node. Subsequently, the midpoint node may record its MCD at the top of the MCD stack, above any prior midpoint node MCD recorded in the MCD stack.

At step 718, the midpoint node may transmit the probe message (e.g., data packet) to the next hop. For instance, the midpoint node may transmit the probe message to the next hop designated in the topmost label of the probe message. In some instances, in the event of ECMP, the midpoint node may use the entropy field of the SEL label to select the next hop for the probe message.

Figure 8:
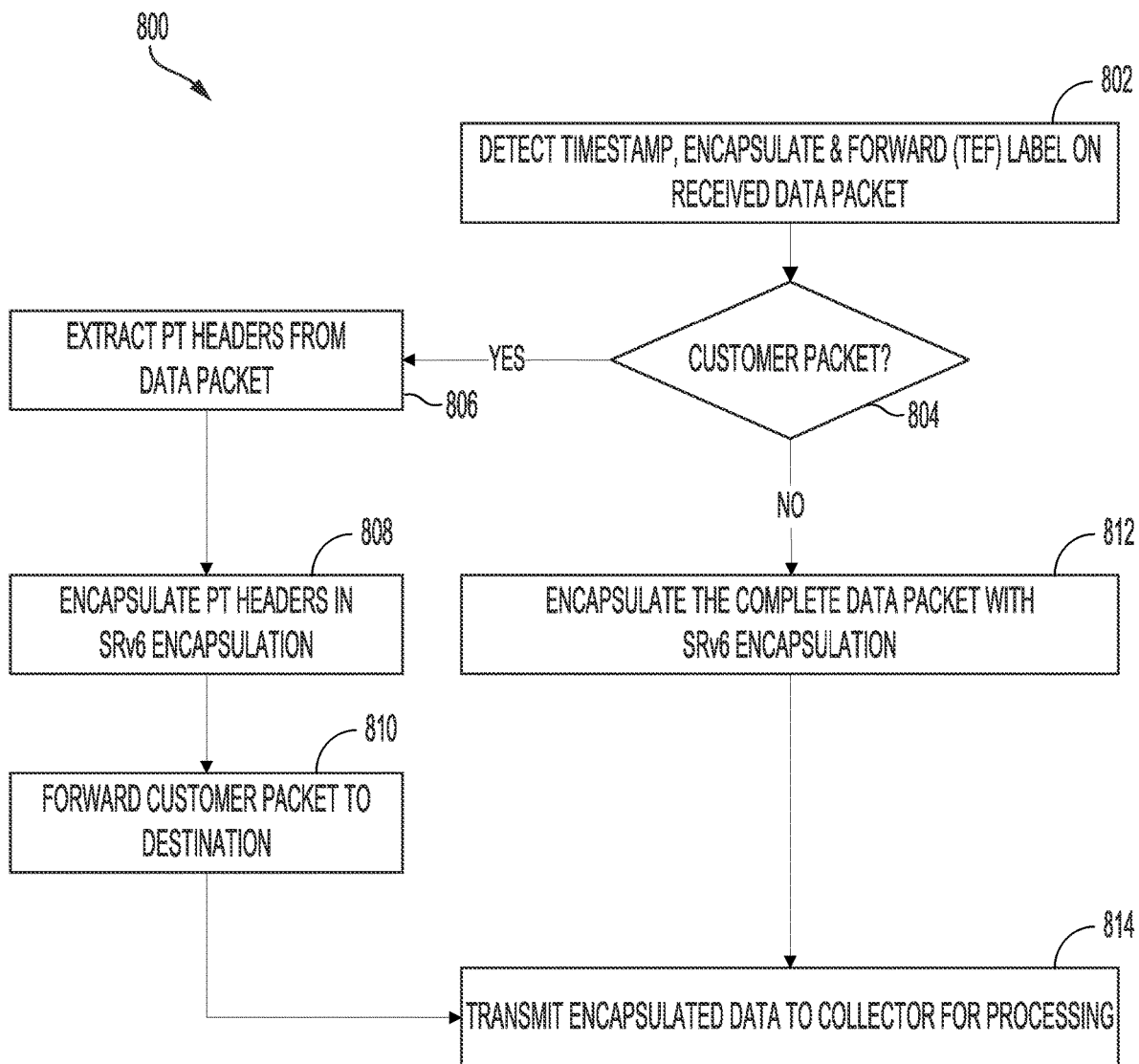
FIG. 8 shows an illustrative example of a process for encapsulating path tracing data from a data packet and providing the encapsulated path tracing data to a collector for processing in accordance with at least one embodiment.

FIG. 8 shows an illustrative example of a process 800 for encapsulating path tracing data from a data packet and providing the encapsulated path tracing data to a collector for processing in accordance with at least one embodiment. The process 800 may be performed by a sink node that serves as an egress point for a particular network path. The process 800 may be initiated in response to receiving a data packet from a previous hop, such as a midpoint node along a particular network path. As noted above, the data packet may include a MPLS stack and a path tracing header. The MPLS stack and the path tracing header may include the packet header, instruction header, and path tracing data of the various nodes along the path, as noted above. For instance, the data packet may include an SR-MPLS label stack or MPLS transport label, an TEF network programming label, an ELI label, a SEL label, and a G-ACH header.

At step 802, the sink node may evaluate the data packet to detect the TEF network programming label. The sink node may be configured with an SR policy that may be triggered in response to the TEF network programming label. For instance, the TEF network programming label may be used as a binding SID in order to trigger the configured SR policy at the sink node for encapsulation of the path tracing information included in the received data packet.

At step 804, the sink node may determine whether the received data packet is a customer data packet. As noted above, the sink node can support different encapsulation behaviors for both probe messages and customer data packets that include path tracing information. For instance, in an embodiment, a source node can add a different TEF network programming label than that used for standalone probe messages. Thus, through evaluation of the TEF network programming label and of the data packet itself, the sink node may determine whether the received data packet is a customer data packet or a probe message.

If the received data packet is a customer data packet, the sink node, at step 806, may extract the MPLS stack and the path tracing data from the data packet. Additionally, at step 808, the sink node may encapsulate the MPLS stack and the path tracing data in SRv6 encapsulation. The SRv6 encapsulation may comprise an outer IPv6 header, a SRH, and a SRH-TLV. The SRH-TLV may be used to carry the sink node path tracing information, which may include the timestamp, interface identifier, and the interface load of the sink node. The customer packet remaining in the data packet may be transmitted by the sink node to its intended destination at step 810. If the received data packet is a probe message, the sink node, at step 812, may encapsulate the complete probe message with SRv6 encapsulation. As with a customer data packet including path tracing information, the SRv6 encapsulation may comprise an outer IPv6 header, a SRH, and a SRH-TLV.

At step 814, the sink node may transmit the encapsulated data to a collector for processing. For instance, if the original data packet is a customer data packet, the sink node may transmit the SRv6 encapsulation with the MPLS stack and path tracing data extracted from the customer data packet. Alternatively, if the original data packet is a probe message, the sink node may transmit the SRv6 encapsulation along with the entirety of the probe message to the collector for processing. In response to receiving the SRv6 encapsulation along with the MPLS stack and path tracing data (or probe message), the collector may parse the received data packet and trace the path of the data packet using a network topology database. Further, the collector may reconstruct full 64-bit timestamps from the timestamps recorded at the midpoint nodes along the path. The collector may additionally compute the hop-by-hop and end-to-end delay along the path.

FIG. 9 illustrates an example network device 900 suitable for performing switching, routing, and other networking operations in accordance with some implementations. Network device 900 includes a CPU 904, interfaces 902, and a connection 910 (e.g., a Peripheral Component Interconnect (PCI) bus). When acting under the control of appropriate software or firmware, the CPU 904 is responsible for executing packet management, error detection, and/or routing functions. The CPU 904 can accomplish these functions under the control of software including an operating system and any appropriate applications software. The CPU 904 may include one or more processors 908, such as a processor from the Intel® X98 family of microprocessors. In some cases, the processor 908 can be specially designed hardware for controlling the operations of network device 900. In some cases, a memory 906 (e.g., non-volatile RAM, ROM, etc.) also forms part of the CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 904 to efficiently perform routing computations, network diagnostics, security functions, etc.

Although the system shown in FIG. 9 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC 912 can communicate with other components in the network device 900 via the connection 910, to exchange data and signals and coordinate various types of operations by the network device 900, such as routing, switching, and/or data storage operations, for example.

FIG. 10 illustrates a computing system architecture 1000 including various components in electrical communication with each other using a connection 1006, such as a bus, in accordance with some implementations. Example system architecture 1000 includes a processing unit (CPU or processor) 1004 and a system connection 1006 that couples various system components including the system memory 1020, such as ROM 1018 and RAM 1016, to the processor 1004. The system architecture 1000 can include a cache 1002 of high-speed memory connected directly with, in close proximity to, or integrated as part of the processor 1004. The system architecture 1000 can copy data from the memory 1020 and/or the storage device 1008 to the cache 1002 for quick access by the processor 1004. In this way, the cache can provide a performance boost that avoids processor 1004 delays while waiting for data. These and other modules can control or be configured to control the processor 1004 to perform various actions.

Other system memory 1020 may be available for use as well. The memory 1020 can include multiple different types of memory with different performance characteristics. The processor 1004 can include any general purpose processor and a hardware or software service, such as service 1 1010, service 2 1012, and service 3 1014 stored in storage device 1008, configured to control the processor 1004 as well as a special-purpose processor where software instructions are incorporated into the actual processor design. The processor 1004 may be a completely self-contained computing system, containing multiple cores or processors, a bus, memory controller, cache, etc. A multi-core processor may be symmetric or asymmetric.

To enable user interaction with the computing system architecture 1000, an input device 1022 can represent any number of input mechanisms, such as a microphone for speech, a touch-sensitive screen for gesture or graphical input, keyboard, mouse, motion input, speech and so forth. An output device 1024 can also be one or more of a number of output mechanisms known to those of skill in the art. In some instances, multimodal systems can enable a user to provide multiple types of input to communicate with the computing system architecture 1000. The communications interface 1026 can generally govern and manage the user input and system output. There is no restriction on operating on any particular hardware arrangement and therefore the basic features here may easily be substituted for improved hardware or firmware arrangements as they are developed.

Storage device 1008 is a non-volatile memory and can be a hard disk or other types of computer readable media which can store data that are accessible by a computer, such as magnetic cassettes, flash memory cards, solid state memory devices, digital versatile disks, cartridges, RAMs 1016, ROM 1018, and hybrids thereof.

The storage device 1008 can include services 1010, 1012, 1014 for controlling the processor 1004. Other hardware or software modules are contemplated. The storage device 1008 can be connected to the system connection 1006. In one aspect, a hardware module that performs a particular function can include the software component stored in a computer-readable medium in connection with the necessary hardware components, such as the processor 1004, connection 1006, output device 1024, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
   receiving a data packet;
   performing a Multiprotocol Label Switching (MPLS) lookup on a label stack of the data packet to determine a next hop for the data packet;
   scanning the label stack to identify a label, wherein the label includes a field comprising a path tracing indicator (PTI);
   computing midpoint compressed data (MCD), wherein the MCD is computed as a result of the PTI in the label stack being set to a pre-defined value;
   recording the MCD in a MCD stack of the data packet, wherein the MCD is recorded by shifting the MCD stack by a number of bytes equal to a size of the MCD and stamping the MCD on top of the MCD stack; and
   transmitting the data packet to the next hop.

2. The computer-implemented method of claim 1, wherein the data packet includes instructions for computing and recording the MCD in the data packet.

3. The computer-implemented method of claim 1, wherein an entropy label control (ELC) field of a structured entropy label (SEL) in the label stack is used to determine a path tracing action for the data packet.

4. The computer-implemented method of claim 1, wherein the label stack of the data packet includes a timestamp, encapsulate, and forward (TEF) label that causes a sink node receiving the data packet to:
   encapsulate the data packet to generate an encapsulated data packet; and
   send the encapsulated data packet to a collector.

5. The computer-implemented method of claim 1, wherein a network programming label is used to determine a path tracing action for the data packet, and wherein the network programming label includes one or more fields that are used to determine the path tracing action.

6. The computer-implemented method of claim 1, wherein the PTI is set at a source node to trigger a path tracing action at midpoint nodes.

7. The computer-implemented method of claim 1, wherein the label stack of the data packet further defines a channel type, wherein the channel type indicates a format of a message that follows a generic associated channel (G-ACH) in the label stack, and wherein the format is the MCD stack and a source node Type-Length-Value (TLV).

8. A system, comprising:
   one or more processors; and
   memory storing thereon instructions that, as a result of being executed by the one or more processors, cause the system to:
   receive a data packet;
   perform a Multiprotocol Label Switching (MPLS) lookup on a label stack of the data packet to determine a next hop for the data packet;
   scan the label stack to identify a label, wherein the label includes a field comprising a path tracing indicator (PTI);
   compute midpoint compressed data (MCD), wherein the MCD is computed as a result of the PTI in the label stack being set to a pre-defined value;
   record the MCD in a MCD stack of the data packet, wherein the MCD is recorded by shifting the MCD stack by a number of bytes equal to a size of the MCD and stamping the MCD on top of the MCD stack; and
   transmit the data packet to the next hop.

9. The system of claim 8, wherein the data packet includes additional instructions for computing and recording the MCD in the data packet.

10. The system of claim 8, wherein an entropy label control (ELC) field of a structured entropy label (SEL) in the label stack is used to determine a path tracing action for the data packet.

11. The system of claim 8, wherein the label stack of the data packet includes a timestamp, encapsulate, and forward (TEF) label that causes a sink node receiving the data packet to:
   encapsulate the data packet to generate an encapsulated data packet; and
   send the encapsulated data packet to a collector.

12. The system of claim 8, wherein a network programming label is used to determine a path tracing action for the data packet, and wherein the network programming label includes one or more fields that are used to determine the path tracing action.

13. The system of claim 8, wherein the PTI is set at a source node to trigger a path tracing action at midpoint nodes.

14. The system of claim 8, wherein the label stack of the data packet further defines a channel type, wherein the channel type indicates a format of a message that follows a generic associated channel (G-ACH) in the label stack, and wherein the format is the MCD stack and a source node Type-Length-Value (TLV).

15. A non-transitory, computer-readable storage medium storing thereon executable instructions that, as a result of being executed by one or more processors of a computer system, cause the computer system to:
  receive a data packet;
  perform a Multiprotocol Label Switching (MPLS) lookup on a label stack of the data packet to determine a next hop for the data packet;
  scan the label stack to identify a label, wherein the label includes a field comprising a path tracing indicator (PTI);
  compute midpoint compressed data (MCD), wherein the MCD is computed as a result of the PTI in the label stack being set to a pre-defined value;
  record the MCD in a MCD stack of the data packet, wherein the MCD is recorded by shifting the MCD stack by a number of bytes equal to a size of the MCD and stamping the MCD on top of the MCD stack; and
  transmit the data packet to the next hop.

16. The non-transitory, computer-readable storage medium of claim 15, wherein the data packet includes additional instructions for computing and recording the MCD in the data packet.

17. The non-transitory, computer-readable storage medium of claim 15, wherein an entropy label control (ELC) field of a structured entropy label (SEL) in the label stack is used to determine a path tracing action for the data packet.

18. The non-transitory, computer-readable storage medium of claim 15, wherein the label stack of the data packet includes a timestamp, encapsulate, and forward (TEF) label that causes a sink node receiving the data packet to:
  encapsulate the data packet to generate an encapsulated data packet; and
  send the encapsulated data packet to a collector.

19. The non-transitory, computer-readable storage medium of claim 15, wherein a network programming label is used to determine a path tracing action for the data packet, and wherein the network programming label includes one or more fields that are used to determine the path tracing action.

20. The non-transitory, computer-readable storage medium of claim 15, wherein the PTI is set at a source node to trigger a path tracing action at midpoint nodes.

* * * * *